United States Patent Office 3,073,663
Patented Jan. 15, 1963

3,073,663
BLACK DYEING OF POLYMER TEXTILES
Wolfgang Rösener, Erlenbach (Main), Germany, assignor to Vereinigte Glanzstoff-Fabriken A.G., Wuppertal-Elberfeld, Germany
No Drawing. Filed Dec. 27, 1960, Ser. No. 78,338
Claims priority, application Germany Dec. 31, 1959
7 Claims. (Cl. 8—55)

This invention relates to a dyestuff and method for the black dyeing of synthetic polymer textile materials and to the resulting dyed products which are colored black and have excellent fastness properties. The invention is particularly useful in imparting a black color to textile materials of those polymers which are known to have an especially poor affinity for dyestuffs.

There is now a wide variety of synthetic polymers which are known to have textile properties, i.e. they are capable of being spun and drawn into filaments or films and then further processed for suitable textile uses. Such polymers are characterized as high molecular weight linear compounds, and their fiber-forming properties are due to the fact that the individual long chain molecules can be oriented with respect to each other to give a structure which is similar to natural fibers. Typical polymers are the well known polyamides, such as polycaprolactam, polyhexamethylene diamine and the like, and also polyacrylonitrile. Polyesters have also been widely accepted as fiber-forming polymers, e.g., polyethylene terephthalate. More recently, there has been considerable interest in the use of textiles of polyolefines, especially polyethylene, polypropylene and polybutylene.

The physical properties of the particular polymers are of course important in determining the suitability of the resulting textile product. However, regardless of its physical properties, no polymer can be widely adapted as a textile unless it can be dyed to give some variety of colors. Therefore the utility of any particular polymer is often chiefly influenced by its capability of being dyed. For example, many useful dyestuffs have been found for the polyamides, polyesters and polyacrylonitrile. In the case of polyolefines, very few suitable dyestuffs have been found because these polymers exhibit a poor affinity for all of the common dyestuffs and their fastness properties are correspondingly deficient.

The problem of black dyeing of textiles is particularly difficult to solve, not only with respect to the polyolefines but also as regards all of the above mentioned polymers. There are a few known black dyestuffs which can be incorporated with the textile material, but the resulting products have a generally poor fastness to light and rubbing. For this reason, it has always been necessary to produce the black dyed materials by the addition of a pigment such as carbon black prior to spinning and drawing the polymer into its textile form, e.g. by "spin dyeing," sometimes referred to as "internal dyeing."

One object of the present invention is to provide a novel dyestuff capable of giving a black dyeing on synthetic polymer textiles with excellent fastness properties.

Another object of the invention is to provide a new method of dyeing various synthetic polymers in the form of textile materials so as to obtain black dyed products with a high resistance to light and rubbing.

Another object of the invention is to avoid the use of typical pigments such as carbon black and to obtain a black color by means of immersing the textile in a dyebath rather than by the so-called internal or spin dyeing method.

Still another object of the invention is to provide a suitable black dyestuff for polyolefine textiles or fibers, especially for polypropylene.

These and other objects and advantages of the invention are realized according to the following detailed description.

In accordance with the invention, it has now been discovered that new and improved black dyeings on synthetic polymer textile materials are obtained with a dyestuff which is prepared by reacting tetracyanoethylene with pyrrole in an inert organic solvent at elevated temperature, preferably at about 70° C. to 100° C., and in the presence of sulfur. The reaction solution, i.e. the inert organic solvent containing the novel dyestuff, can be directly used for dyeing the textile material by application of the solution to the textile. The textile material is preferably immersed in the solution or dye bath at a temperature of about 75° C. to 100° C. for a period of time sufficient to impregnate the textile and obtain a uniform coloring, e.g. about 15 to 60 minutes. The dyed material is then contacted with saturated steam to fix or develop the dyestuff on the material, the steam temperature being about 110° C. to 140° C., preferably in the neighborhood of about 130° C. The treatment with saturated steam is advantageously carried out for a period of about thirty minutes to two hours.

The formula of the compounds employed as a black dyestuff has not been determined, but it can be readily obtained by the novel and relatively simple method described herein.

In preparing this dyestuff, an inert reaction medium is required, i.e. a solvent for the tetracyanoethylene which does not otherwise substantially inhibit the reaction with pyrrole in the presence of sulfur. Hydrocarbon solvents are therefore especially preferred such as aromatic hydrocarbons, and their lower alkyl substituted and hydrogenated derivatives. Benzene is particularly useful because of its relatively low cost and availability. Other useful hydrocarbons include toluene, xylene, decalin and tetralin. The same solvents are equally useful for subsequent dyeing of the textile.

The dyestuff is conveniently prepared by first dissolving the tetracyanoethylene in benzene or other inert hydrocarbon and then adding sulfur powder to the resulting solution. Instead of elemental sulfur in finely divided or powder form, the reaction can also be carried out after addition of various sulfur-containing compounds such as hydrogen sulfide, sodium sulfide, sodium thiosulfate or alkali metal polysulfides. When employing such sulfur-containing compounds, it is recommended that a small amount of glacial acetic acid also be added in order to free the sulfur. In such cases, it will be recognized that elemental or free sulfur is being released in situ.

Pyrrole is then added to the solution, and the reaction is carried out at about 70–100° C. Depending upon the particular solvent employed, the pressure of the reaction can be varied so as to maintain the solvent at about its boiling point within this temperature range. Thus, with benzene the reaction is suitably carried out at atmospheric pressure at a temperature of about 80° C. With solvents having a higher or lower boiling point than benzene, the reaction can be carried out in a vacuum or at elevated pressures for adjustment of the boiling point. The same principle applies when using the solvent as a dye bath. The reaction is completed after a very short period of time as indicated by the change of color in adding pyrrole to a very dark brown solution. The textile material can be immediately dyed in this dark solution without any pretreatment, although it is usually desirable to dilute the solution with additional solvent.

The relative proportions of the reactants and solvent are preferably as follows: about 0.2 to 1 part by weight of tetracyanoethylene and about 0.2 to 1 part by weight of sulfur to approximately 100 parts by weight of anhydrous benzene or other solvent; and added thereto about 0.6 to 3 parts by weight of pyrrole. The reaction solution is diluted if necessary so that the resulting dyebath contains about 0.001 to 0.005% of the black dyestuff with respect to the total weight of the bath.

During the dyeing process, the ratio by weight of the textile material to the dye bath is preferably about 1:30 to 1:50 e.g. for each kilogram of textile, there are about 30 to 50 kilograms of the solution. Immersion of the textile in the bath usually requires at least about 15 minutes up to about one hour at temperatures of 75–100° C. After this dyeing step, excess solvent is removed from the textile, and saturated steam is applied thereto in order to fully develop a deep black color. The steam treatment is at least about 20 minutes, depending upon the steam temperature, and preferably about 30 minutes up to 2 hours.

The dyeing method of the invention is especially useful because the dye bath corresponds essentially to the reaction mixture which is obtained by the production of the dyestuff. Therefore, no costly operations are required to separate or purify the dyestuff. Polyacrylonitrile fibers as well as polyesters fibers can be dyed black by working according to the inventive process. The best results are obtained, however, with polyamide fibers and especially with polypropylene fibers. The dyeings are characterized by good light fastness and rubbing fastness.

The invention is further illustrated but not limited by the following examples:

*Example 1*

10 grams of tetracyanoethylene are dissolved in 1 liter of water-free benzene with the formation of a yellow colored addition complex. 10 grams sulfur powder are added to this solution and brought into the solution by heating at 80° C. Then 4 grams of pyrrole are added whereby the solution turns a dark brown. In this reaction solution, a polypropylene fabric is heated without any further pretreatment for thirty minutes at 80° C. After this time, the fabric has taken up a dark olive color. By continuous treatment with steam for about thirty minutes at 125° C. an intensive dark color develops. The fabric is washed with soap and acetone. The fastness tests, as described below, give a light fastness value of 7 and a rubbing fastness value of 3–4 (dry) and 3–4 (wet).

*Example 2*

In a dyebath corresponding to that produced in Example 1, a polyamide fabric (polycaprolactam) is colored and then subjected to a saturated steam treatment. Light fastness tests, which have been carried out after the washing, give a light fastness value of 6 and a rubbing fastness value of 4 (dry) and 3 (wet). Substantially the same results are obtained with other polyamide textile materials.

The black dyeing with the same dye bath on textiles of polyethylene terephthalate and polyacrylonitrile gives the following results:

| | Light fastness | Rubbing fastness | |
|---|---|---|---|
| | | Dry | Wet |
| Polyethylene terephthalate | 4 | 3 | 2 |
| Polyacrylonitrile | 3–4 | 2–3 | 1 |

The light fastness and rubbing fastness tests described in the above examples were carried out in accordance with the German DIN-standards as set forth in "Tests for the Colour Fastness of Textiles, Part 11 (Light-Fastness), and Part 18 (Rubbing-Fastness), draft ISO, No. 117."

Those skilled in the dyestuff art will recognize the advantageous properties of the new dyestuffs and the resulting dyed products for application in the field of synthetic polymer textiles. The results with polypropylene are particularly outstanding in view of the previous difficulties in finding any suitable dyestuffs for this material. It will be understood, of course, that the solvent employed and the various reaction conditions set forth are relatively non-critical in obtaining the results of the invention and can be varied within a reasonable area without departing from the spirit or scope of the invention.

The invention is hereby claimed as follows:

1. A method for the black dyeing of a synthetic polymer textile material which comprises: immersing said textile material in an inert organic solvent which contains as the essential dyestuff component the compound produced by reacting 1 to 5 parts of tetracyanoethylene with 3 to 15 parts of pyrrole in an inert organic solvent at about 70° to 100° C. and in the presencve of 1 to 5 parts of sulfur; and subsequently treating the dyed material with saturated steam.

2. A method as claimed in claim 1 wherein the textile material is polycaprolactam.

3. A method as claimed in claim 1 wherein the textile is polypropylene.

4. A black synthetic polymer textile material as prepared by the method of claim 1.

5. A black polycaprolactam textile material as prepared by the method of claim 1.

6. A black polypropylene textile material as prepared by the method of claim 1.

7. A black dyestuff prepared by heating 1 to 5 parts of tetracyanoethylene with 3 to 15 parts of pyrrole in an inert organic solvent at about 70° to 100° C. and in the presence of 1 to 5 parts of sulfur.

References Cited in the file of this patent

UNITED STATES PATENTS

| 2,883,388 | England | Apr. 21, 1959 |
| 2,889,335 | Heckert | June 2, 1959 |

FOREIGN PATENTS

| 809,495 | Great Britain | Feb. 25, 1959 |
| 814,582 | Great Britain | June 10, 1959 |